United States Patent [19]

Baum

[11] 3,766,971

[45] Oct. 23, 1973

[54] APPARATUS FOR REMOVING POLLUTANTS FROM STACK EFFLUENTS

[76] Inventor: Edward J. Baum, 1900 S.W. Pheasant Dr., Aloha, Oreg. 97005

[22] Filed: May 13, 1971

[21] Appl. No.: 143,125

[52] U.S. Cl............................ 165/1, 165/111, 55/82
[51] Int. Cl................................................ F28b 3/00
[58] Field of Search........................ 165/1, 111, 112, 165/110; 55/82

[56] References Cited
UNITED STATES PATENTS

| | | | |
|---|---|---|---|
| 3,589,169 | 6/1971 | Lafitte | 55/82 |
| 3,651,686 | 3/1972 | Dizio | 55/82 |

*Primary Examiner*—Charles Sukalo
*Attorney*—Daniel P. Chernoff and Jacob E. Vilhauer

[57] ABSTRACT

A series of controlled gradient condensers for removing gaseous hydrocarbon pollutants from the stack effluent of an industrial treating plant, such as a veneer dryer. The gaseous effluent stream is conducted from the industrial treating plant to a pre-cooler to bring the effluent temperature to the condensation point of the highest boiling pollutant. Thereafter the effluent stream is passed through a successive series of controlled gradient condenser, each operating in a temperature range lower than that of the immediately preceding condenser. The first several condensers are air cooled and designed to remove the higher boiling pollutants. Each air cooled condenser is wrapped with one or more heater coils, the turns of which are not uniformly wound about the condenser tubes but are more widely spaced toward the outlet or cold end of the condenser. Electric power to each heater coil is controlled by a respective power controller responsive to temperature sensors located inside the condenser for measuring a temperature gradient along the path of flow of the effluent. If any measured temperature gradient exceeds a predetermined maximum allowable limit, the power controller adjusts the electric power through the appropriate heater coil to restore the temperature gradient, and thus the cooling rate, to a value below the maximum limit. As long as the predetermined maximum temperature gradient or cooling rate for each gaseous pollutant is not exceeded the formation of aerosol is avoided and substantially all of the pollutant condenses in collectable liquid form on the walls of the condenser, thereby cleansing the effluent. Each condenser has a reservoir which collects the condensed pollutants by gravity feed, while the uncondensed remaining effluent passes to the next succeeding condenser. The last in the series of condensers is water cooled for condensing those pollutants having the lowest boiling points. The temperature gradient in the water cooled condenser is controlled by temperature sensors, similar to those in the air cooled condensers, which modulate the flow of coolant by controlling the power to the coolant pump. The different temperature ranges at which the respective condensers operate are preferably fixed so that the minimum temperature at the outlet of a respective condenser is greater than the highest melting point of any pollutant condensed within that condenser, so as to prevent solidification of the pollutants and fouling of the condensers. Immersion heaters in the condenser reservoirs further aid in preventing solidification. If solidification of one or more pollutants collected in a particular condenser cannot be avoided, scraper paddles are provided to scrape the solid material off the condenser walls for disposal through a solids removal port. The reservoir of the last in the series of condensers, from which the remaining effluent is vented to the atmosphere, includes a reservoir auxiliary cooling system for the purpose of further reducing effluent temperature if necessary to remove any remaining contaminants.

17 Claims, 2 Drawing Figures

United States Patent [19]
Baum
[11] 3,766,971
[45] Oct. 23, 1973
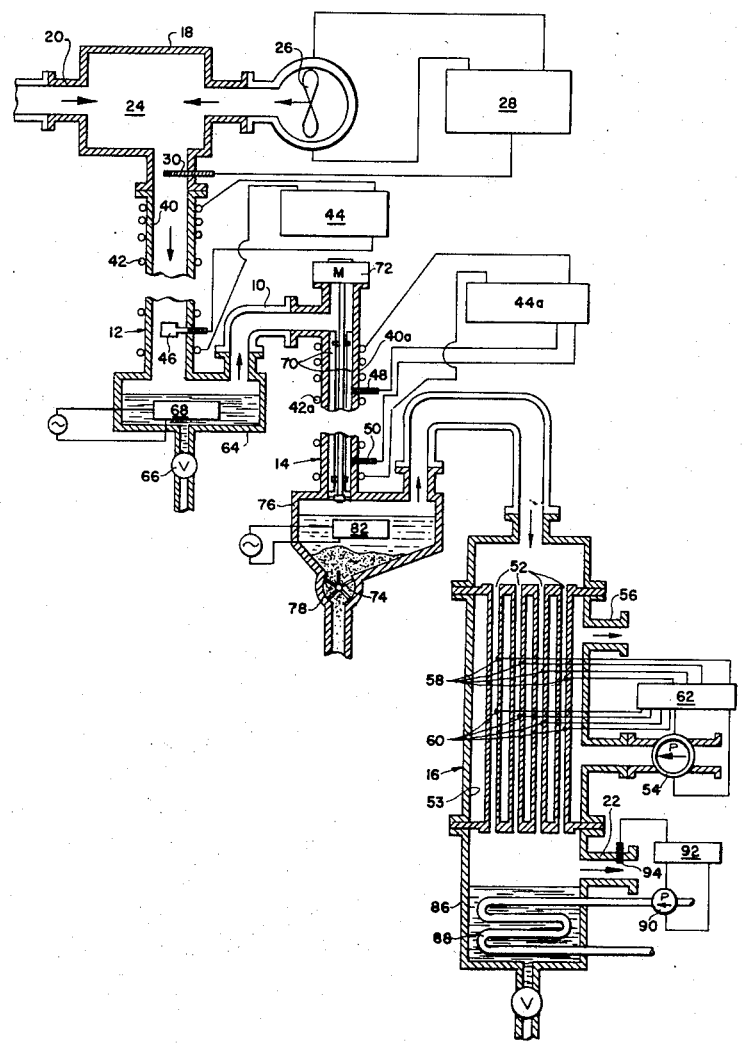

PATENTED OCT 23 1973
3,766,971
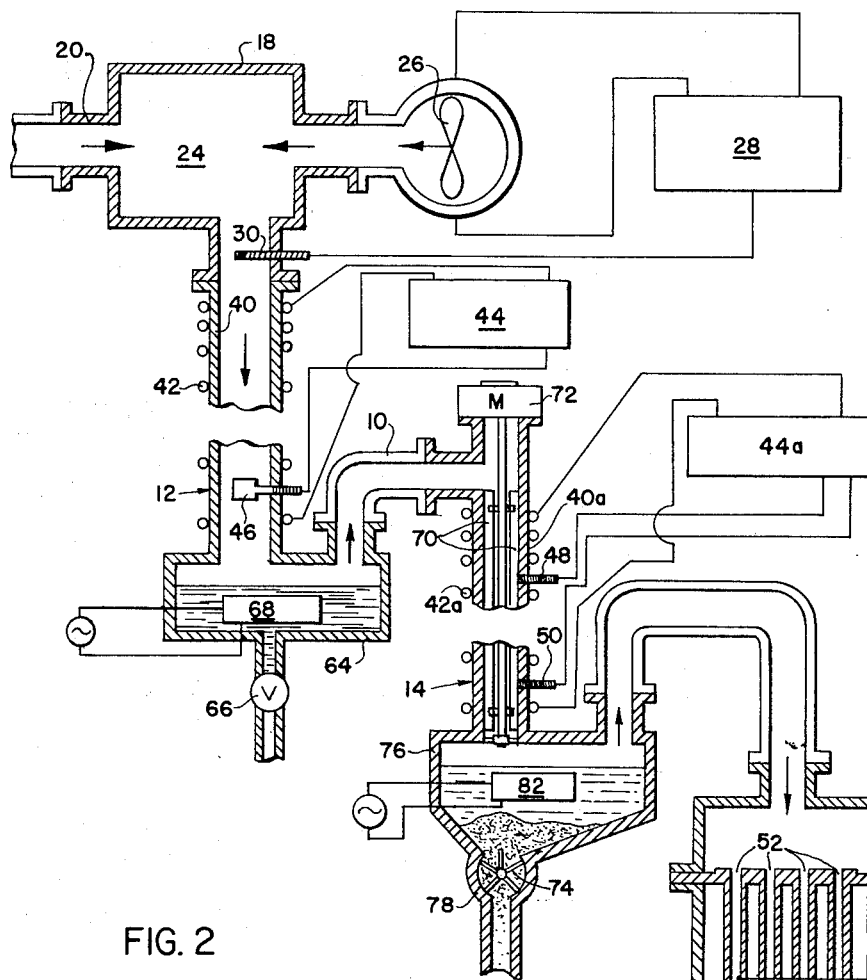
FIG. 1
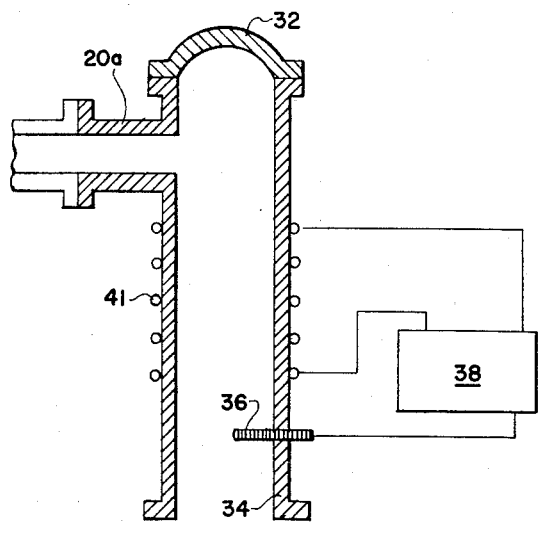
FIG. 2
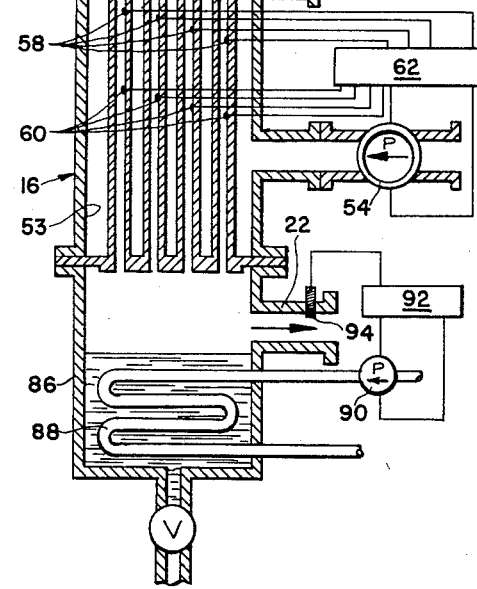

3,766,971

APPARATUS FOR REMOVING POLLUTANTS FROM STACK EFFLUENTS

BACKGROUND OF THE INVENTION

This invention relates to an improvement in apparatus for purifying the stack effluent of an industrial treating plant before the effluent is vented to the atmosphere. More specifically, the apparatus is of the type comprising a series of flow-through gradient condensers for gradually cooling the effluent and condensing and removing the pollutants in liquid or semi-solid form. In addition to effluent purification, the system may be useful for other commercial application such as gas liquefaction.

In the past a number of methods for cleaning hydrocarbon emissions from stack effluents have been utilized. These include such methods as incineration, catalytic oxidation, scrubbing, activated carbon absorption, and high energy filtration. Each of these systems has certain inherent drawbacks, either with respect to economy or effectiveness.

Industrial condensers have long been utilized for condensing and collecting various components of gaseous mixtures, but these systems are not effective for accomplishing the complete cleansing of a gaseous effluent. The reason for this is that conventional condensers do not have temperature gradient or cooling rate control and tend to cool gases too rapidly as the gas flows through the condenser. When cooling is too rapid the gaseous components condense in the form of suspended aerosol droplets, a large portion of which are carried along in the effluent stream and vented from the condenser without collecting on the condenser walls. While such systems might be satisfactory for certain commercial uses, where the material being collected rather than the purity of the gas emitted from the condenser is of primary importance, such systems are not suitable for effluent purification purposes. In fact it is often necessary that other purification devices be used in conjunction with such systems to control aerosol.

Some types of condensers, for example those utilizing liquid coolant counterflow systems, are characterized by an impressed temperature gradient between the inlet and outlet ends of the condenser. However, the temperature gradient is not controlled and is merely a result, rather than a cause, of the thermodynamic characteristics of the condenser. No controlled temperature gradient or cooling rate is established along the path of flow of the gaseous effluent to prevent the undesirable formation of aerosol.

SUMMARY OF THE PRESENT INVENTION

The present invention is directed to an apparatus for removing the hydrocarbon pollutants from the gaseous stack effluent of an industrial treating plant before the effluent is vented to the atmosphere. The apparatus comprises a series of controlled flow-through gradient condensers, each cooling the effluent stream through a temperature range lower than that of the immediately preceding condenser and each collecting those pullutants having condensation points falling within its respective temperature range. The first or highest temperature condenser is preceded by a precooler, if necessary, to bring the effluent temperature down to the condensation point of the highest boiling pollutant. Each of the condensers is provided with means for preventing the substantial formation of aerosol by controlling the maximum cooling rate of the effluent, particularly in those temperature ranges corresponding to specific condensation points of pollutants known to be present in the effluent. The higher temperature air cooled condensers control the cooling rate by utilizing one or more heater coils wrapped about the condenser, the turns of which are not uniformly wound but are more widely spaced toward the cold or outlet end of the condenser. The electrical power to each heater coil is controlled by a power controller responsive to temperature sensors located inside the condenser wall for sensing the temperature differential along the effluent stream. If the temperature differential exceeds a predetermined maximum limit, the power controller adjusts the power to the heater coils to restore the differential, and thus the cooling rate, to within the maximum limit. As an alternative to the temperature sensors, or as an overriding control in addition thereto, an aerosol monitor in the condenser measures the formation of aerosol and adjusts the power supply to the heater coils to reduce the cooling rate when the aerosol count rate exceeds a predetermined limit. The lower temperature condensers are preferably liquid cooled, with the cooling rate controlled by temperature sensors or aerosol monitors which modulate the flow of coolant by controlling the power to the coolant pump.

The temperature ranges of the various condensers are preferably set so that the minimum temperature of the effluent in each condenser is greater than that necessary to solidify the highest melting pollutant condensed within that particular condenser, so as to avoid fouling of the condensers. In addition the condenser reservoirs, where the pollutants are collected in liquid form, preferably include immersion heaters to further prevent solidification. Where solidification of one or more of the pollutants collected in a particular condenser cannot be avoided, mechanically driven scraper paddles are provided to remove such solids from the condenser walls. The last in the series of condensers, from which the purified effluent is vented to the atmosphere, is provided with a reservoir auxiliary cooling system for the purpose of further reducing effluent temperatures if necessary to remove any remaining hydrocarbon contaminants. The degree of auxiliary cooling is controlled by a monitor which measures remaining hydrocarbon concentrations at the point where the effluent is vented to the atmosphere.

The novel features of the present invention provide it with a number of important characteristics necessary to overcome the economic and operational deficiencies of those purification and condenser devices previously described. Significant among these novel features is the provision of gradient cooling control in the condensers, ensuring that each pollutant is condensed at a cooling rate insufficient to allow the substantial formation of aerosol droplets. As a result substantially all of the condensed pollutants are in fact collected by the condensers and removed from the gaseous effluent rather than remaining suspended in the effluent stream.

Moreover the provision of multiple flow-through condensers in series, each operating in a successively lower predetermined temperature range, facilitates the collection of at least most of the pollutants in liquid rather than solid form. This feature minimizes the fouling of the condensers, reduces maintenance costs, and allows economic disposal of the waste products. The provision of heated reservoirs and solids removal apparatus where needed further helps to achieve these objectives.

Furthermore the provision of an auxiliary cooling system in the reservoir of the final condenser, operating in response to a hydrocarbon concentration monitor, provides a final safeguard by continually testing the effectiveness of the system and improving the purity of the effluent, if necessary, prior to its release into the atmosphere.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a schematic side elevation view of an illustrative embodiment of the condenser system including a precooler.

FIG. 2 is a schematic view of a preheater which, in one embodiment of the invention, replaces the precooler of FIG. 1.

DESCRIPTION OF THE PREFERRED EMBODIMENT

The effluent purifying system of FIG. 1 comprises essentially two air cooled flow-through gradient condensers 12 and and 14 connected in series by insulated effluent conduit 10, followed by a water cooled gradient condenser 16. A precooler 18 precedes the series of condensers.

The purpose of the condensers is to remove the hydrocarbon pollutants from the stack effluent of an industrial treating plant such as a veneer dryer (not shown) before the effluent is vented to the atmosphere. The gases enter the system at port 20 and pass consecutively through the condensers, which gradually cool the effluent and thereby liquify and remove the various pollutants. The remaining purified effluent is vented to the atmosphere through outlet port 22 of the final condenser 16.

The number and type of consecutive condensers utilized, the temperature range through which each condenser cools the effluent, and the necessity for precooler 18 are all determined by the initial composition and temperature of the effluent emitted from the industrial treating plant. By way of illustration, assume that a treating plant emits effluent at 500°F containing the following hypothetical hydrocarbon pollutants A through E, with boiling and melting points adjusted to allow for operating pressures in the condensers:

| Pollutant | Boiling Point | Melting Point |
| --- | --- | --- |
| A | 400°F | 275°F |
| B | 260°F | 30°F |
| C | 230°F | −50°F |
| D | 200°F | −20°F |
| E | 150°F | −60°F |

Since the effluent is emitted from the treating plant at a temperature considerably higher than the boiling point of the highest boiling pollutant "A," it is desirable that a precooler 18 bring the effluent temperature down to 400°F before the effluent enters the first condenser 12. This avoids the expense of providing condenser 12 with extra cooling capacity. If the temperature at which the effluent is emitted were lower than the boiling point of pollutant "A" it would be desirable to incorporate a preheater, rather than a precooler, in advance of condenser 12 to maintain the effluent at least at the temperature at which it is emitted from the treating plant before it enters condenser 12. In any case the temperature at which the effluent enters the first condenser 12 should preferably be at or below the boiling point of the highest boiling contaminant to be removed from the effluent.

The lowest temperature to which condenser 12 cools the effluent should be greater than the highest melting point of any pollutant condensed therein, so as to avoid solidification of the pollutant and fouling of the condenser. Therefore the temperature at which the effluent leaves condenser 12 should be higher than the melting point of pollutant "A," say 300°F. Since pollutant "A" is an exceptionally high melting compound, forming tars at a temperature higher than the boiling points of the other pollutants, only "A" is collected in condenser 12 and further condensers must be provided to remove the other pollutants.

The second air cooled condenser 14 cools the effluent from the temperature at which it was exhausted from condenser 12 to an exit temperature which, again, is preferably higher than the highest melting point of any pollutant condensed in condenser 14. Since, for reasons of compactness, it is less desirable to condense by air cooling below 212°, condenser 14 operates between 300°F and 212°F, condensing and removing pollutants B and C with no problem of solidification. Thereafter a water cooled condenser 16 condenses lower boiling pollutants D and E in the temperature range from 212°F to 60°F.

It may be that the gaseous effluent of the treating plant contains additional pollutants having respective boiling and melting points such that it is economically impractical to avoid the solidification problem. In such case a solids removal device, to be described hereafter in detail, is included in any condenser where one or more pollutants is collected and cooled below its melting point.

Having described the general operation of the effluent purifying apparatus, the features of the individual components of the system will now be described in detail. By way of general definition it should be pointed out that the various power controllers described in the following text may comprise any of a number of commercially available electrical control devices such as silicon controlled rectifiers operated alone or in parallel responsive to control signals generated in an amplified measuring circuit. The measuring circuit itself might incorporate a differential voltage comparator comprising operational amplifier circuits. Furthermore the temperature sensors described hereafter may comprise any suitable electrical sensor such as a thermocouple or thermistor. All inlet and outlet ports as well as all conduits joining the various components of the system are preferably insulated to minimize heat transfer and uncontrolled cooling.

Precooler 18 has an electrically powered fan 26 which forces ambient temperature air into chamber 24, where the air mixes with and cools the raw gaseous effluent entering the chamber through port 20. The rate of air coolant feed is controlled by a power controller 28 which modulates the electric power supplied to fan 26 in response to signals received from an effluent temperature sensor 30. If the effluent temperature at the outlet of precooler 18 exceeds the desired inlet temperature of the first condenser 12, sensor 30 causes controller 28 to increase the power to fan 26, thereby increasing the rate of coolant feed. Conversely if the precooler outlet temperature is too low, controller 28 reduces the power to fan 26.

If temperature maintanance rather than precooling of the effluent is necessary, as explained above, a preheater 32 as shown in FIG. 2 might replace precooler 18 if desired. Preheater 32 has an inlet port 20a through which the effluent from the treating plant enters. At outlet 34, which connects to the inlet end of the first condenser 12, a temperature sensor 36 monitors the temperature of the effluent and controls the power supplied to electric heater coil 41 through power controller 38. If the temperature measured by sensor 36 falls below the desired value, power control 38 increases the power to heater coil 41, and conversely if the temperature rises above the desired value, the power is reduced.

Condensers 12 and 14 are both preferably of the air cooled cross-flow type since they are designed to operate in relatively high temperature ranges. Each condenser may comprise either one or a bundle of condenser tubes 40, 40a respectively, and each may or may not be cooled by a forced air system, depending upon the desired cooling range of each condenser and the practical length and cross section of the condenser tubes.

A significant feature of both air cooled condensers is that they include means for controlling the maximum rate at which the effluent stream passing through them is cooled. This control is established by heater coils 42, 42a wrapped about the respective condenser tubes, the turns of which are preferably not uniformly wound but are more widely spaced toward the cold or outlet end of the respective condensers. When power is applied to the coils they emit heat which, because of the uneven winding, tends to raise the temperature of the condenser walls unevenly, more toward the upstream end of the condenser than the downstream end. This causes a temperature gradient to be imposed along the condenser walls and results in an overall reduction in the cooling rate, i.e., the rate at which heat is extracted from the effluent. An increase in power applied to the heaters further reduces the rate of cooling, while a decrease in power increases the cooling rate.

Although evenly wound coils would also cause a reduction in cooling rate, the uneven windings are preferable because they cause a greater reduction toward the upstream end of the condenser, where it is most needed since the cooling rate sought to be reduced is also greater toward that end. Alternatively, evenly wound coils could be used with closer spacing toward the upstream end, or multiple immersion heaters inside the condenser grouped more closely toward the upstream end.

It is a recognized phenomenon that if a stream of gas is passed through a condenser tube at a high flow rate, and if heat is removed too quickly by impressing an excessively cold temperature on the gas, the gas will condense in the form of suspended aerosol droplets throughout the cross section of the stream rather than condensing merely in those regions close to the condenser walls. If this happens a large portion of the aerosol will be swept through the condenser tube too quickly to migrate toward the walls and collect thereon, and will be vented from the condenser without being collected and removed. However for any specific gaseous compound flowing through a particular condenser at a particular flow rate, a maximum allowable cooling rate can be experimentally established, above which uncollectable amounts of aerosol are observed to form in the condenser, and below which substantially no aerosol is formed and the compound condenses on the condenser walls. Such experimentation can be performed by gradually increasing the power to a heater coil such as 42 while observing visually or by means of an aerosol monitor that point where the cooling rate is sufficiently reduced that aerosol formation in the condenser is minimized and condensate collection is maximized. That point establishes the maximum allowable cooling rate, which can thereafter be controlled by controlling the impressed temperature gradient along the path of flow of the effluent by modulating the power to heater coils 42 and 42a so as to stay within the maximum cooling rate.

Electrical power to heater coils 42, 42a can be controlled by any of several methods. For example heater coil 42 is controlled by a power controller 44 in response to an aerosol monitor 46, such as a piezoelectric oscillator, which samples the effluent stream and generates an emf proportional to an aerosol count rate. Upon sensing a count rate above a desirable level, aerosol monitor 46 causes power controller 44 to increase the electrical power to heater coil 42, thereby decreasing the cooling rate along the path of flow of the effluent. As long as the count rate is within desirable limits power controller 44 supplies as little power as possible to heater 42 to maximize the cooling rate without thereby increasing the formation of aerosol to beyond desired limits.

An alternative method of controlling the maximum cooling rate is shown with respect to condenser 14 where the power to heater coil 42a is modulated by power controller 44a in response to a temperature differential in the effluent stream measured by temperature sensors 48 and 50. If the measured temperature differential, which is proportional to the cooling rate of the effluent, exceeds a predetermined limit, power controller 44a increases the electrical power to heater coil 42a to restore the temperature differential to within the maximum limit. As long as the maximum temperature differential is not exceeded, power controller 44a delivers as little power as possible to heater 42a to maintain the maximum allowable cooling rate.

It is also conceivable that primary control could be effected by temperature sensors such as 48 and 50 with an aerosol monitor such as 46 acting as an overriding control in addition to the temperature sensors.

One or more independent heater coils may be used along the length of each condenser tube 40, 40a, depending on the precision of control required. Since the effluent temperature drops steadily from the inlet to the outlet end of each condenser, condensation of some of the pollutants may take place in different regions along the length of each condenser depending upon where the effluent temperature corresponds to the boiling point of the particular pollutant. Since some of the pollutants may have different optimum cooling rates than others, it may be desirable to install multiple heater coil and power controller systems on a particular condenser to achieve controlled effluent cooling separately with respect to the different condensation regions.

The water cooled gradient condenser 16 controls the maximum effluent cooling rate by a method which differs somewhat from air cooled condensers 12 and 14. The gaseous effluent flowing through the tubes 52 of condenser 16 is cooled by a counterflow of water, pumped through the jacket 53 of the condenser by electrically powered pump 54 and emptied through port 56. The rate of cooling depends on the flow rate at which the coolant is pumped through the condenser by pump 54. A group of temperature sensors 58 and a corresponding group of sensors 60 continually monitor the effluent temperature gradient, and if the gradient exceeds a predetermined level, indicating an excessive cooling rate, the sensors cause power controller 62 to reduce the electrical power supplied to pump 54, thereby slowing the flow of coolant and reducing the cooling rate. Power controller 62 normally supplies as much power as possible to pump 54 without thereby exceeding the predetermined maximum temperature gradient. Alternatively to temperature sensors 58 and 60, it is conceivable that an aerosol monitor such as 46 could sample the effluent stream to control the power supply to pump 54. Obviously the method of cooling control utilized with respect to condenser 16 could be applied to any condenser using forced fluid cooling, such as a forced air condenser.

Each of the condensers has its own separate reservoir which collects the condensed pollutants by gravity feed. If high effluent speeds are attained in the condenser pipes each reservoir is preferably constructed of sufficient diameter, and the amount of condensate in the reservoir is kept sufficiently low, by continuous removal thereof, that the linear effluent velocity through the reservoirs is reduced below that at which dust, solids or liquid may be swept out. Reservoir 64 of condenser 12 is designed to collect high boiling pollutants in liquid form only. The reservoir is equipped with a condensate removal valve 66 and an immersion heater 68 which ensures that the liquid condensate does not cool below the melting point of any of the contaminants.

Condenser 14 on the other hand is equipped to collect contaminants both in liquid and solid form. Such provision must be made when solidification of some contaminants within a particular condenser cannot be economically avoided. Condenser 14 is equipped with scraper paddles 70 rotatably driven by a motor 72 at moderate speed. The paddles are spring biased against the inner walls of the condenser, and their rotation tends to scrape any solidified pollutants off the walls and drop them into reservoir 76. The reservoir has a discharge valve 78 comprising a series of driven rotating paddles 74 through which both the solids and liquids collecting in the reservoir are removed. Reservoir 76 is further equipped with an immersion heater 82 similar to 68, for preventing solidification of the liquid in the reservoir.

Reservoir 86 of water cooled condenser 16 is the place from which the purified effluent, having passed through all condensation steps, is vented to the atmosphere. Because of this fact, and because the lower boiling pollutants in reservoir 86 generally have very low melting points with no danger of solidification, reservoir 86 is equipped with an auxiliary cooling or refrigeration system rather than a heater. In its simplest form the cooling system comprises immersed coil 88 through which electric pump 90 forces a stream of cooling water. The degree of cooling is determined by the flow rate of coolant through coil 88. A power controller 92 modulates the coolant flow rate in response to a hydrocarbon concentration monitor 94, such as a total hydrocarbon analyzer or flame ionization detector, which tests the purity of the effluent stream just before it is vented to the atmosphere. If the monitor 94 detects hydrocarbon concentrations in excess of a predetermined maximum limit, possibly determined by government regulation, the power controller 92 increases the rate of coolant flow through coil 88 thereby lowering the temperature of the liquid in the reservoir. This further reduces the effluent temperature and reduces the vapor pressures of the remaining contaminants to the point where they will condense and be collected in reservoir 86 prior to the emission of the effluent into the atmosphere. If a more elaborate refrigeration system were used instead of the water cooled system shown in FIG. 1, power controller 92 could modulate cooling either through compressor power control or refrigerant flow control.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of removing components from a stream of gaseous effluent which comprises:
    a. gradually extracting heat from the effluent by cooling the effluent through the boiling points of the various components to be removed, thereby condensing the components;
    b. monitoring the amount of said components condensed in the form of aerosol; and
    c. reducing the rate at which heat is extracted from the effluent whenever the amount of said components condensed in the form of aerosol exceeds a predetermined limit.

2. A method of removing a component from a stream of gaseous effluent by gradually cooling the stream and liquefying the component which comprises:
    a. determining a maximum rate of cooling for the stream above which the amount of aerosol formed in said stream by said cooling exceeds a predetermined limit; and
    b. gradually cooling said stream through the boiling point of said component at a controlled rate of cooling within said maximum rate of cooling.

3. The method of claim 2, wherein the cooling step (b) comprises:
    measuring the rate at which said effluent stream is being cooled; and
    reducing the rate at which said effluent stream is cooled when the measured cooling rate exceeds said predetermined maximum cooling rate.

4. The method of claim 2, further comprising:
    precooling the stream of effluent in advance of cooling step (b) down to the boiling point of the highest boiling component therein.

5. The method of claim 2, further comprising:
    measuring the concentration of said component in the effluent after the cooling step (b); and further cooling said effluent stream if such component concentration is in excess of a predetermined limit.

6. A method of removing pollutants from a stream of gaseous stack effluent before such effluent is vented to the atmosphere which comprises:
 a. gradually cooling the effluent stream through the boiling points of the various pollutants to be removed, thereby condensing and separating such pollutants from said effluent;
 b. measuring the pollutant concentration in the effluent after such cooling step;
 c. further cooling said effluent stream prior to venting it to the atmosphere if such pollutant concentration is in excess of a predetermined limit.

7. A method of removing pollutants from the gaseous stack effluent of an industrial treating plant, said pollutants having different boiling and melting points and a first one of said pollutants having a boiling point and a melting point higher than the boiling point of a second one of said pollutants, which method comprises:
 a. cooling said effluent to the boiling point of said first pollutant to liquefy said first pollutant;
 b. further cooling said effluent toward the boiling point of said second pollutant;
 c. removing said first pollutant from said effluent in liquid form before said effluent is cooled to the boiling point of said second pollutant.

8. The method of claim 1 wherein said first pollutant is removed from said effluent before said effluent is cooled to the melting point of said first pollutant.

9. The method of claim 1 wherein said cooling step (a) is accomplished by passing said effluent stream through a condenser, and wherein said cooling rate reduction step (c) is accomplished by emitting heat adjacent said gaseous effluent stream to counteract the cooling of said stream by said condenser.

10. The method of claim 9, further comprising exposing a piezoelectric oscillator to said effluent stream for measuring an aerosol count rate in said stream and utilizing said piezoelectric oscillator to generate an emf in proportion to said count rate for controlling the emission of said heat.

11. The method of claim 2 wherein said cooling step (b) is accomplished by passing said stream through a condenser and wherein said rate of cooling is controlled by emitting heat adjacent to said stream to counteract the cooling of said stream by said condenser.

12. The method of claim 11 wherein a greater concentration of heat is emitted toward the upstream end of said condenser where said effluent stream enters than toward the downstream end, so as to cause a reduction in cooling rate which is greater toward the upstream end than toward the downstream end of said condenser.

13. The method of claim 2 wherein said cooling step (b) is accomplished by passing said stream through a condenser of the type which cools said effluent stream by means of a flow of coolant, and wherein said cooling rate is controlled by controlling the rate of flow of said coolant.

14. The method of claim 2, further comprising preheating the stream of effluent in advance of cooling step (b) to maintain the temperature of said stream at substantially the boiling point of the highest boiling component therein.

15. The method of claim 3 wherein the rate at which said effluent stream is cooled is measured by means of a pair of temperature sensors located a spaced distance apart along the path of flow of said stream to measure the temperature differential of said stream between said temperature sensors.

16. The method of claim 7 including the step of supplying heat to said first pollutant after it has been removed from said effluent so as to prevent solidification of said first pollutant.

17. The method of claim 7 wherein said effluent is cooled by passing it through a condenser and wherein said first pollutant is removed from said effluent by collecting it in a reservoir located at a point along the path of travel of said effluent through said condenser in advance of the point where said condenser cools said effluent to the melting point of said first pollutant.

* * * * *